US012438766B2

(12) United States Patent
Scott

(10) Patent No.: US 12,438,766 B2
(45) Date of Patent: Oct. 7, 2025

(54) SERVICE DEPENDENCIES BASED ON RELATIONSHIP NETWORK GRAPH

(71) Applicant: PagerDuty, Inc., San Francisco, CA (US)

(72) Inventor: Sean Scott, Seattle, WA (US)

(73) Assignee: PagerDuty, Inc., San Francisco, CA (US)

( * ) Notice: Subject to any disclaimer, the term of this patent is extended or adjusted under 35 U.S.C. 154(b) by 0 days.

(21) Appl. No.: 18/763,670

(22) Filed: Jul. 3, 2024

(65) Prior Publication Data
US 2024/0364578 A1 Oct. 31, 2024

Related U.S. Application Data

(63) Continuation of application No. 18/162,374, filed on Jan. 31, 2023, now Pat. No. 12,068,907.

(51) Int. Cl.
*H04L 41/0604* (2022.01)
*H04L 41/0631* (2022.01)

(52) U.S. Cl.
CPC ........ *H04L 41/0613* (2013.01); *H04L 41/065* (2013.01)

(58) Field of Classification Search
None
See application file for complete search history.

(56) References Cited

U.S. PATENT DOCUMENTS

| | | | | |
|---|---|---|---|---|
| 7,552,447 | B2* | 6/2009 | Uthe | H04L 41/0631 714/48 |
| 7,631,058 | B2* | 12/2009 | Grabarnik | H04L 41/0631 709/223 |
| 8,890,676 | B1* | 11/2014 | Heath | G08B 29/188 340/508 |
| 10,367,710 | B2* | 7/2019 | Li | H04L 43/12 |
| 10,530,667 | B2* | 1/2020 | Calo | H04L 41/5058 |
| 10,645,121 | B1* | 5/2020 | Nimmagadda | H04L 41/142 |
| 10,915,626 | B2* | 2/2021 | Tang | H04L 41/142 |
| 11,269,718 | B1* | 3/2022 | Chen | G06F 11/079 |
| 11,329,863 | B1* | 5/2022 | Turgeman | H04L 41/0622 |
| 11,487,880 | B2* | 11/2022 | Karin | G06F 11/3065 |
| 11,651,254 | B2* | 5/2023 | Kataria | G06F 11/0751 714/25 |
| 11,651,262 | B2* | 5/2023 | Marinescu | G06N 5/02 709/224 |

(Continued)

FOREIGN PATENT DOCUMENTS

EP 3001317 A1 * 3/2016 .......... G06F 11/0709

*Primary Examiner* — Melvin H Pollack
(74) *Attorney, Agent, or Firm* — Young Basile Hanlon & MacFarlane, P.C.

(57) ABSTRACT

Interaction data between entities responsible for services in an information technology environment are collected. The interaction data includes communications between the entities where at least some of the entities represent respective persons, teams, or organizations of people. A relationship network graph based is constructed on the interaction data. The nodes of the relationship network graph represent the entities and the edges of the relationship network graph represent interactions between the entities. Dependencies between the services are identified by traversing the relationship network graph.

20 Claims, 11 Drawing Sheets

(56) References Cited

U.S. PATENT DOCUMENTS

| | | | | |
|---|---|---|---|---|
| 11,675,473 B1* | 6/2023 | Breeden | G06F 3/04847 | 715/738 |
| 11,704,188 B2* | 7/2023 | Gupta | H04L 41/22 | 714/37 |
| 11,704,617 B2* | 7/2023 | Lopopolo | G06Q 30/0201 | 705/7.25 |
| 11,711,381 B2* | 7/2023 | Muthuswamy | H04L 63/1416 | 726/23 |
| 11,734,101 B2* | 8/2023 | Garapati | G06F 16/9024 | 709/224 |
| 11,755,559 B1* | 9/2023 | Tankersley | G06F 16/2358 | 707/694 |
| 11,762,869 B1* | 9/2023 | Werner | G06T 11/206 | 707/722 |
| 11,768,755 B2* | 9/2023 | Wang | G06F 11/301 | 714/45 |
| 11,770,401 B2* | 9/2023 | Geil | G06F 16/9024 | 726/25 |
| 11,789,804 B1* | 10/2023 | Danyi | G06F 11/079 | 714/38.1 |
| 11,792,229 B2* | 10/2023 | Crabtree | G06F 16/9024 | 726/22 |
| 11,843,628 B2* | 12/2023 | Fellows | H04L 63/0428 | |
| 11,847,027 B2* | 12/2023 | Gowda | G06F 11/1464 | |
| 11,930,046 B2* | 3/2024 | Albanese | H04L 63/1433 | |
| 11,947,934 B2* | 4/2024 | Rahill-Marier | G06F 8/38 | |
| 11,947,939 B1* | 4/2024 | Longmore | G06F 8/433 | |
| 11,956,116 B2* | 4/2024 | R | H04L 41/0631 | |
| 11,985,023 B2* | 5/2024 | A | G06F 16/21 | |
| 11,989,632 B2* | 5/2024 | Haribhakti | G06F 18/214 | |
| 12,099,428 B1* | 9/2024 | Agarwal | G06F 16/24556 | |
| 12,113,661 B2* | 10/2024 | Agrawal | H04L 41/0613 | |
| 2011/0302652 A1* | 12/2011 | Westerfeld | H04L 43/10 | 726/22 |
| 2014/0032552 A1* | 1/2014 | Cohen | H04L 41/065 | 707/E17.046 |
| 2020/0252261 A1* | 8/2020 | Arora | H04L 43/0817 | |
| 2020/0252264 A1* | 8/2020 | Arora | H04L 43/0817 | |
| 2021/0152416 A1* | 5/2021 | A | H04L 41/145 | |
| 2023/0016199 A1* | 1/2023 | Jividen | G06N 20/00 | |
| 2023/0169170 A1* | 6/2023 | Yaron | G06F 21/577 | 726/1 |
| 2024/0097966 A1* | 3/2024 | Harsh | H04L 41/065 | |
| 2024/0114349 A1* | 4/2024 | Miguel | H04L 41/16 | |
| 2024/0114363 A1* | 4/2024 | Miguel | H04L 41/22 | |
| 2024/0223435 A1* | 7/2024 | Chan | H04L 41/12 | |
| 2024/0380771 A1* | 11/2024 | Shahul Hameed | G06F 21/552 | |

* cited by examiner

| | Timestamp | Source Entity | Interaction Type | Destination Entity | Weight |
|---|---|---|---|---|---|
| 612 | May 3, 08:00 | B | Telephone Call | E | Low |
| 614 | May 3, 10:25 | EMS | Incident Report | B | n/a |
| 616 | May 3, 10:30 | A | Email Message | B | High |
| 618 | May 3, 12:15 | B | Assignment of Incident | C | High |
| 620 | May 3, 12:30 | A | Text Message | D | Low |
| 622 | May 3, 12:55 | E | Meeting Invite | F | Low |
| 624 | May 3, 13:30 | E | Meeting Invite | B | High |
| 626 | May 3, 13:30 | E | Meeting Invite | A | High |
| 628 | May 3, 16:45 | F | Phone Call | A | Medium |
| 630 | May 3, 17:00 | G | Chat Communication | B | Medium |
| 632 | May 3, 23:00 | D | Phone Call | E | High |
| 634 | May 4, 09:30 | H | Meeting Invite | A | Low |
| 636 | May 4, 11:00 | EMS | Incident Report | H | n/a |
| 638 | May 4, 11:15 | A | Email Message | B | Medium |
| 640 | May 4, 11:20 | I | Phone Call | H | High |

FIG. 6

SERVICE DEPENDENCIES BASED ON RELATIONSHIP NETWORK GRAPH

CROSS REFERENCE TO RELATED APPLICATION(S)

This application is a continuation of U.S. patent application Ser. No. 18/162,374, filed Jan. 31, 2023, the entire disclosure of which is incorporated herein by reference.

TECHNICAL FIELD

This disclosure relates generally to managing services and, more specifically, to determining dependencies among services using a relationship network graph of service owners.

BACKGROUND

Information technology (IT) systems are increasingly becoming complex, multivariate, and in some cases nonintuitive systems with varying degrees of nonlinearity. These complex IT systems may be difficult to model or accurately understand. Dependencies between services in these IT systems can be difficult to recognize unless expressly declared by a service owner. Even then, a service may be dependent on other services unaware to the service owner. Various monitoring systems may be arrayed to provide events, alerts, notifications, or the like, in an effort to provide visibility into operational metrics, failures, and/or correctness. Events, alerts, and notifications sent to a service may include information that is useful to other services that are dependent on the service. The monitoring system needs to know the services that are dependent on the service to provide the information and avoid flooding the entire system with the information.

SUMMARY

A first aspect of the disclosed implementations is a method that includes collecting interaction data between entities responsible for services in an information technology environment, where the interaction data includes communications between the entities, and where at least some of the entities represent respective persons, teams, or organizations of people; constructing a relationship network graph based on the interaction data, where nodes of the relationship network graph represent the entities and edges of the relationship network graph represent interactions between the entities; and identifying dependencies between the services by traversing the relationship network graph.

A second aspect of the disclosed implementations is a system that includes one or more memories and one or more processors configured to execute instructions stored in the one or more memories to collect interaction data between entities responsible for services in an information technology environment, where the interaction data includes communications between the entities, and where at least some of the entities represent respective persons, teams, or organizations of people; construct a relationship network graph based on the interaction data, where nodes of the relationship network graph represent the entities and edges of the relationship network graph represent interactions between the entities; and identify dependencies between the services by traversing the relationship network graph.

A third aspect of the disclosed implementations is one or more non-transitory computer readable media that store instructions operable to cause one or more processors to perform operations that include collecting interaction data between entities responsible for services in an information technology environment, where the interaction data includes communications between the entities, and where at least some of the entities represent respective persons, teams, or organizations of people; constructing a relationship network graph based on the interaction data, where nodes of the relationship network graph represent the entities and edges of the relationship network graph represent interactions between the entities; and identifying dependencies between the services by traversing the relationship network graph.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 6 is an example of an interaction information dataset.

DETAILED DESCRIPTION

Figure 1:
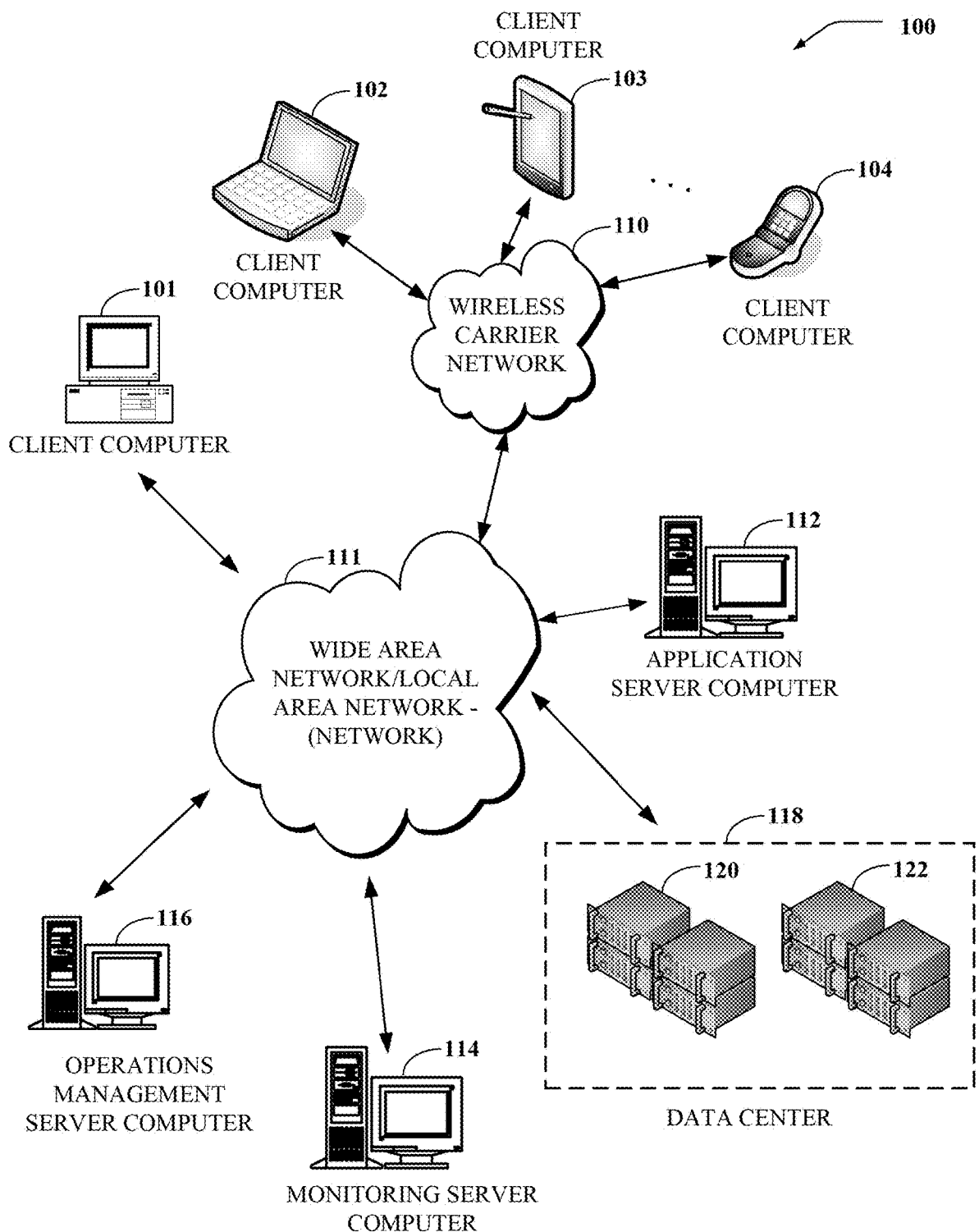
FIG. 1 shows an example of a computing environment for event management.

An event management bus (EMB) is a computer system that may be arranged to monitor, manage, or compare the computer operations of one or more organizations. The EMB may be configured to accept various events that indicate conditions occurring in computers of the one or more organizations. The EMB may be arranged to manage computers of several organizations at the same time.

Briefly, an event can simply be an indication of a state of change to a component of an organization, such as hardware, software, or an IT service (or, simply, service). An event can be or describe a fact at a moment in time that may consist of a single or a group of correlated conditions that have been monitored and classified into an actionable state. As such, a monitoring tool of an organization may detect a condition in the IT environment of the organization and transmit a corresponding event to the EMB. The event may include an identification of, or may be used to identify, a service that is impacted by the state of change. Depending on the level of impact (e.g., level of degradation of a service), if any, to one or more constituents of a managed organization, an event may trigger (e.g., may be, may be classified as, may be converted into) a service incident for the impacted service. A service can be any grouping of related computing (e.g., software) functionality and may perform automated tasks, may respond to software or hardware events, may listen for, and respond to requests to perform actions from other software, may listen for and respond to data requests from other software. Services may be accessed (e.g., invoked) via prescribed interfaces. A service can have at least one service owner. A service owner is an entity (e.g., a person, a team of people) that is responsible for responsible for, responsible for maintaining, responsible for monitoring, or the like, the service.

Non-limiting examples of events may include that a monitored operating system process is not executing, that a virtual machine is restarting, that disk space on a certain device is low, that processor utilization on a certain device is higher than a threshold, that a shopping cart service of an e-commerce site is unavailable, that a digital certificate has or is expiring, that a certain web server is returning a 503 error code (indicating that web server is not ready to handle requests), that a customer relationship management (CRM) system is down (e.g., unavailable) such as because it is not responding to ping requests, and so on.

Events may be received by the EMB due to an underlying cause that caused the event to be generated. Additional examples of events (or causes that may have triggered or resulted in the events) include that a particular cloud-based service is down, that a particular database is unresponsive, that a particular product line is exhibiting issue (such as system errors in web applications or web services applications), that a web server is down (resulting in customers being unable to access a website offered by the web server); that a particular database is corrupted (such as due to a hardware failure); that DNS routing in a network is failing (resulting in users not being able to access a website using web browsers).

As can be appreciated, IT systems may include or use many IT components. Such IT components may include, to name a few, open-source or proprietary libraries, open-source or proprietary operating systems, open-source or proprietary database systems, cloud computing services, on-premises computing services, open-source or proprietary software platforms, servers, routers, virtual machine, and so on. The malfunction of any one of the IT components can lead to an operational issue of a service.

An event corresponding to the operational issue may be received at an EMB, which in turn may trigger an alert and a service incident. Alerts are often resolved by modifying the functioning (e.g., affecting the configuration or execution) of one or more underlying IT components. An event may be received at an ingestion software of the EMB, accepted by the ingestion software and queued for processing, and then processed. Processing an event can include triggering (e.g., creating, generating, instantiating, etc.) a corresponding alert and a corresponding service incident in the EMB. The service incident may be assigned to a responder (e.g., a person or a group of persons) who may become responsible for resolving the service incident.

The responder may investigate the service incident (or, equivalently, the alert that triggered the service incident) and (ultimately) perform or cause to be performed actions that resolve the service incident. Knowing what services are related to the service impacted by the events that triggered the service incident provides valuable information to the responder and accelerates the investigation into the service incident by potentially narrowing the issues to resolve and/or identifying a root issue. However, existing systems lack the technical capabilities to be able to automatically identify and maintain dependencies amongst services. At best, some existing systems may include capabilities that allow for the manual configuration of service dependencies. However, such is not a scalable approach due, in part, to the complexity of IT environments. Additionally, such manual configuration of service dependencies tends to become outdated, and the manual configuration of service dependencies tends to not be maintained over time.

For instance, when the responder is investigating the status of a service, knowing that the service is dependent on three upstream services allows the responder to check the status of the upstream services to quickly determine if the service incident related to the service is caused by a problem with the service or if there is a problem with the upstream services. If the upstream services are working properly, then the problem likely lies with the service the responder is investigating. However, if an upstream service is not working properly, the problem is likely related to the upstream service. The responder can then make a determination to wait for the upstream problem to resolve, reroute the service to a different upstream provider, or take other corrective action. An upstream service to a service is one that the service uses or is dependent on, either directly or indirectly. To illustrate, the service may call an application programming interface (API) of the upstream service or may use an artifact (e.g., result or side effect) of the upstream service.

Furthermore, when the responder is investigating the status of a service, knowing what downstream services may be dependent on the service allows the responder to warn owners of the downstream services that they are likely to receive alerts and service incidents related to their services and that such may be related to the service. The owners of the downstream services, instead of expending energy and computational resources investigating such alerts or service incidents, may await or contribute to the resolution of the issues related to the service.

Similarly, a service provider may plan to make a change to a service that they provide. It would be beneficial for the service provider to know what services are dependent on the service being changed so that the service provider could provide a notification of the change. In another instance, if a service is experiencing problems, it would be beneficial if the service provider knew the dependencies so that they could provide a notification of the problem.

Implementations according to this disclosure can automatically identify and maintain (e.g., update) dependencies amongst services. Dependencies between services can be identified using a relationship network graph between entities responsible for the services. The relationship network graph can be built by tracking interactions (e.g., communications) among entities and identifying services that each entity is responsible for. An entity can be a person, a team, or an organization. For example, an organization can assign a person or a team to be responsible for a service in the organization, or an organization itself can be assigned as the responsible entity for a service. The relationship network graph can be built with the entities represented as nodes and the interactions between the entities represented as edges. Additionally, the relationship network graph can be augmented manually based on known dependencies identified by an entity. At least some relationships may be determined proactively before there is a service incident associated with a service.

Throughout this disclosure, reference is made to entities interacting with one another and systems communicating with entities. Communications between entities and between entities and systems is defined broadly to include computer systems and software implementations operated by, or in control of an entity to communicate with computers systems and software implementations operated by, or in control of another entity. For example, an organization sending an event message to an EMB is to be construed as a communication device within an infrastructure of the organization as sending the event message to the EMB. Generally, reference to an entity includes the computer systems and software implementations operated by, or in control of, the entity.

The relationship network graph is analyzed to determine entities that are related based on their interactions. The relationship network graph can be built using interaction data sources such as access logs of code repositories, network traffic logs, application call graphs, static code analysis, and analyzed using network analysis techniques to find relationships between nodes in the relationship network graph. The edges in the relationship network graph may be weighted according to different criteria such as the importance of different types of interactions, the frequency of interactions, the number of interactions, and so forth. For instance, interactions between entities that are directly related to a service incident (which is identified as relating to at least one service owned by at least one of the interacting entities) may be weighted higher than interactions between entities that are not directly related to a service incident. For instance, interactions that occur in close proximity to a known (e.g., triggered) service incident may be given a higher weight than an interaction that does not occur in close proximity to a service incident. Additionally, known dependencies may be given a higher weight. Each entity is associated with at least one service that they may be responsible for. The relationships determined using the relationship network graph can be extrapolated to the services that the entities are responsible for. For example, if a first entity is found to be related to a second entity, then the services associated with the first entity can be identified as being related to the services associated with the second entity. The relationship of the services may be saved in data store for later reference.

An EMB according to this disclosure can identify (e.g., extract) a service associated with an event and look up a service owner corresponding to the service. A component-extraction tool of an EMB may identify the service based on data associated with the event (e.g., a service identifier, a title, or a payload of the alert). Identifying a service associated with an event, as used herein, includes identifying the service based on the event. The EMB may store or access information correlating a service to at least one entity that owns the service. The entity that owns a service can be identified by the EMB by looking up the service in the information and returning the identity of the entity correlated to the service. The EMB may use the identity of the service owners to send alerts and other messages related to the events to the service owners. U.S. patent application Ser. No. 17/697,078 which is hereby incorporated in its entirety, provides further details on identifying services, IT components, and responders associated with an event.

In some implementations, the EMB may group alerts based on the service dependencies. To illustrate, assume that a first alert is received for a first service and a second alert is received, within a threshold time of the first alert, for a second service that depends on the first service. A service incident may be created for the first alert and the second alert may be grouped with the first alert under the first service incident. Whether the first and the second alerts are grouped can depend on a dependency strength criterion between the first service and the second service.

In some implementations, the EMB can pause alerts based on the service dependencies. To illustrate, assume that a first alert is received for a first service and a second alert is received, within a threshold time of the first alert, for a second service that depends on the first service. If a dependency strength between the first service and the second service meets a dependency strength threshold, then the second alert may be paused. That the second alert is paused can mean that no service incident is triggered for the second alert for a pause period. That the second alert is paused can mean that a service incident is triggered for the alert, but no notification of the service incident is sent to a responder for the pause period. If the first alert is not resolved within the pause period, then the second alert can be unpaused and notifications of the service incident are sent to the responder. If the first alert is resolved within the pause period, then the EMB may close (resolve) the second alert.

In another implementation, the EMB can generate secondary alerts based on the service dependencies. To illustrate, assume that a first alert is received for a first service and there is a second service that has a dependency strength that meets a first threshold in relation to the first service. The EMB can generate a secondary alert for the second service to inform owners of (entities or persons responsible for) the second service that there is a potential problem at the first service that may impact the second service but is currently being addressed. The secondary alert may be associated with a status indicating that no immediate action is to be taken by the owners. If the first alert is not resolved within a threshold period of time, then the status of the secondary alert may be changed to indicate that action is now required to resolve the secondary alert.

The term "organization" or "managed organization" as used herein refers to a business, a business unit, a company, an association, an enterprise, a confederation, a team, or the like.

The term "event," as used herein, can refer to one or more outcomes, conditions, or occurrences that may be detected (e.g., observed, identified, noticed, monitored, etc.) by an event management bus. An event management bus (which can also be referred to as an event ingestion and processing system) may be configured to monitor various types of events depending on the needs of an industry and/or technology area. For example, information technology services may generate events in response to one or more conditions, such as, computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof.

Events may be provided to the event management bus using one or more messages, emails, telephone calls, library function calls, application programming interface (API) calls, including, any signals provided to an event management bus indicating that an event has occurred. One or more third party and/or external systems may be configured to generate event messages that are provided to the event management bus.

The term "responder" as used herein can refer to a person or entity, represented or identified by persons, who may be responsible for responding to an event associated with a monitored application or service. A responder is responsible for responding to one or more notification events. For example, responders may be members of an information technology (IT) team providing support to employees of a company. Responders may be notified if an event or service incident they are responsible for handling at that time is encountered. In some embodiments, a scheduler application may be arranged to associate one or more responders with times that they are responsible for handling particular events (e.g., times when they are on-call to maintain various IT services for a company). A responder that is determined to be responsible for handling a particular event may be referred to as a responsible responder. Responsible responders may be considered to be on-call and/or active during the period of time they are designated by the schedule to be available.

The term "service incident" as used herein can refer to a condition or state of a service in the managed networking environments that requires some form of resolution. Typically, service incidents may be a failure or error that occurs in the operation of a managed network and/or computing environment. One or more events may be associated with one or more service incidents. However, not all events are associated with service incidents.

The term "service incident response" as used herein can refer to the actions, resources, services, messages, notifications, alerts, events, or the like, related to resolving one or more service incidents. Accordingly, services that may be impacted by a pending service incident, may be added to the service incident response associated with the service incident. Likewise, resources responsible for supporting or maintaining the services may also be added to the service incident response. Further, log entries, journal entries, notes, timelines, task lists, status information, or the like, may be part of a service incident response.

The term "notification message," "notification event," or "notification" as used herein can refer to a communication provided by a service incident management system to a message provider for delivery to one or more responsible resources or responders. A notification event may be used to inform one or more responsible resources that one or more event messages were received. For example, in at least one of the various embodiments, notification messages may be provided to the one or more responsible resources using SMS texts, MMS texts, email, Instant Messages, mobile device push notifications, HTTP requests, voice calls (telephone calls, Voice Over IP calls (VOIP), or the like), library function calls, API calls, URLs, audio alerts, haptic alerts, other signals, or the like, or combination thereof.

The term "team" or "group" as used herein refers to one or more responders that may be jointly responsible for maintaining or supporting one or more services or system for an organization.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

FIG. 1 shows components of one embodiment of a computing environment 100 for event management. Not all the components may be required to practice various embodiments, and variations in the arrangement and type of the components may be made. As shown, the computing environment 100 includes local area networks (LANs)/wide area networks (WANs) (i.e., a network 111), a wireless network 110, client computers 101-104, an application server computer 112, a monitoring server computer 114, and an operations management server computer 116, which may be or may implement an EMB.

Generally, the client computers 102-104 (e.g., client computer 102, client computer 103, and client computer 104) may include virtually any portable computing device capable of receiving and sending a message over a network, such as the network 111, the wireless network 110, or the like. The client computers 102-104 may also be described generally as client computers that are configured to be portable. Thus, the client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. Likewise, the client computers 102-104 may include Internet-of-Things (IoT) devices as well. Accordingly, the client computers 102-104 typically range widely in terms of capabilities and features. For example, a cell phone may have a numeric keypad and a few lines of monochrome Liquid Crystal Display (LCD) on which only text may be displayed. In another example, a mobile device may have a touch sensitive screen, a stylus, and several lines of color LCD in which both text and graphics may be displayed.

The client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of the client computers 102-104 may operate over wired and/or wireless network. Today, many of these devices include a capability to access and/or otherwise communicate over a network such as the network 111 and/or the wireless network 110. Moreover, the client computers 102-104 may access various computing applications, including a browser, or other web-based application.

In one embodiment, one or more of the client computers 101-104 may be configured to operate within a business or other entity to perform a variety of services for the business or other entity. For example, a client of the client computers 101-104 may be configured to operate as a web server, an accounting server, a production server, an inventory server, or the like. However, the client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, or the like, to display and send a message. In one embodiment, a user of the client computer may employ the browser application to perform various actions over a network.

The client computers 101-104 also may include at least one other client application that is configured to receive and/or send data, operations information, between another computing device. The client application may include a capability to provide requests and/or receive data relating to managing, operating, or configuring the operations management server computer 116.

The wireless network 110 can be configured to couple the client computers 102-104 with network 111. The wireless network 110 may include any of a variety of wireless sub-networks that may further overlay stand-alone ad-hoc networks, or the like, to provide an infrastructure-oriented connection for the client computers 102-104. Such sub-networks may include mesh networks, Wireless LAN (WLAN) networks, cellular networks, or the like.

The wireless network 110 may further include an autonomous system of terminals, gateways, routers, or the like connected by wireless radio links, or the like. These connectors may be configured to move freely and randomly and organize themselves arbitrarily, such that the topology of the wireless network 110 may change rapidly.

The wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as the client computers 102-104 with various degrees of mobility. For example, the wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. The wireless network 110 may include virtually any wireless communication mechanism by which information may travel between the client computers 102-104 and another computing device, network, or the like.

The network 111 can be configured to couple network devices with other computing devices, including, the operations management server computer 116, the monitoring server computer 114, the application server computer 112, the client computer 101, and through the wireless network 110 to the client computers 102-104. The network 111 can be enabled to employ any form of computer readable media for communicating information from one electronic device to another. Also, the network 111 can include the internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, archi-tectures, models, and/or standards, may also be employed within the network 111 and the wireless network 110. Furthermore, remote computers and other related electronic devices could be remotely connected to either LANs or WANs via a modem and temporary telephone link. The network 111 can include any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
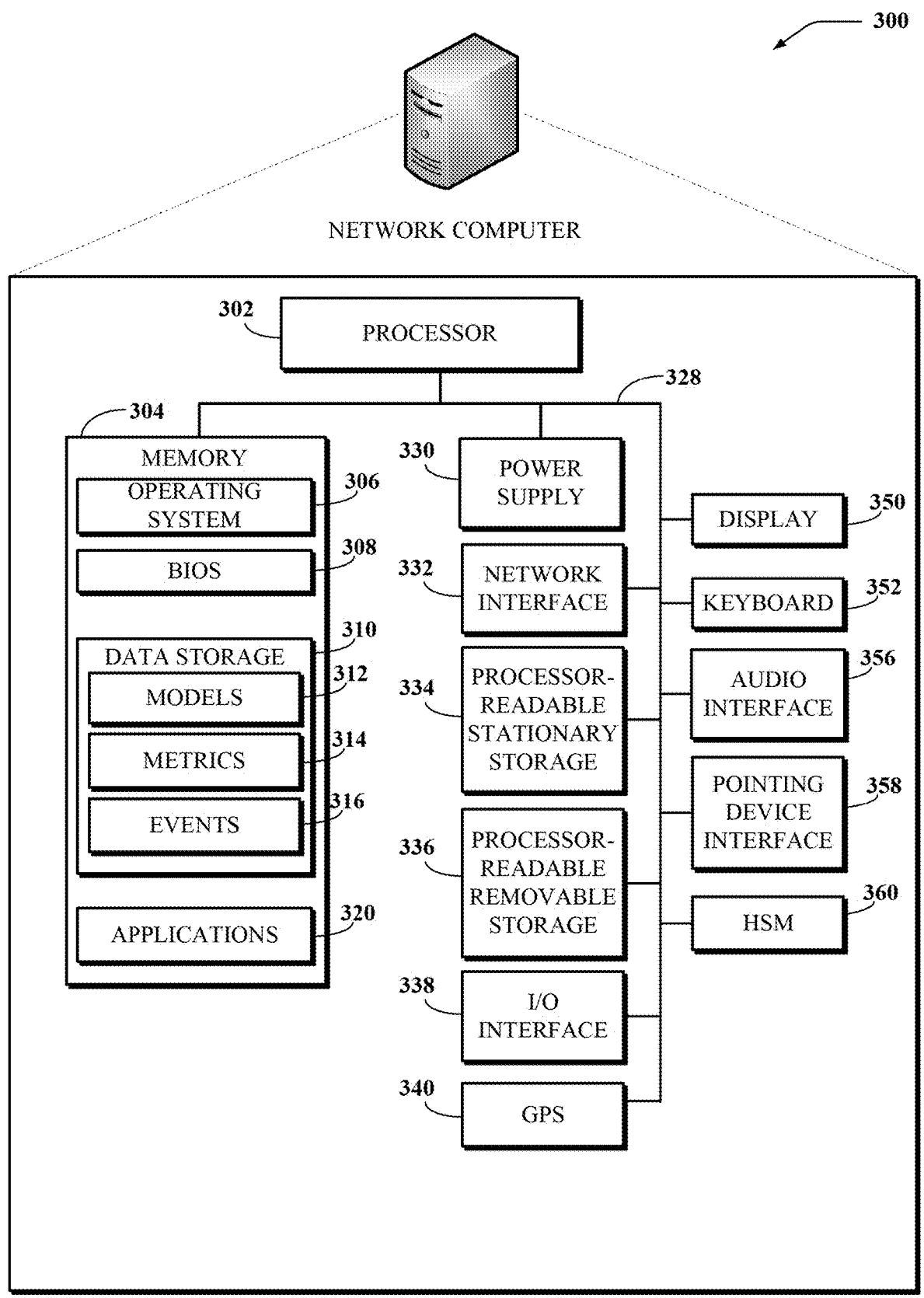
FIG. 3 shows an example of a network computer that may at least partially implement aspects of the various implementations of event management.

The operations management server computer 116 may include virtually any network computer usable to provide computer operations management services, such as a network computer, as described with respect to FIG. 3. In one embodiment, the operations management server computer 116 employs various techniques for managing the operations of computer operations, networking performance, customer service, customer support, resource schedules and notification policies, event management, or the like. Also, the operations management server computer 116 may be arranged to interface/integrate with one or more external systems such as telephony carriers, email systems, web services, or the like, to perform computer operations management. Further, the operations management server computer 116 may obtain various events and/or performance metrics collected by other systems, such as the monitoring server computer 114.

In at least one of the various embodiments, the monitoring server computer 114 represents various computers that may be arranged to monitor the performance of computer operations for an entity (e.g., company or enterprise). For example, the monitoring server computer 114 may be arranged to monitor whether applications/systems are operational, network performance, trouble tickets and/or their resolution, or the like. In some embodiments, one or more of the functions of the monitoring server computer 114 may be performed by the operations management server computer 116.

Devices that may operate as the operations management server computer 116 include various network computers, including, but not limited to personal computers, desktop computers, multiprocessor systems, microprocessor-based or programmable consumer electronics, network PCs, server devices, network appliances, or the like. It should be noted that while the operations management server computer 116 is illustrated as a single network computer, the invention is not so limited. Thus, the operations management server computer 116 may represent a plurality of network computers. For example, in one embodiment, the operations management server computer 116 may be distributed over a plurality of network computers and/or implemented using cloud architecture.

Moreover, the operations management server computer 116 is not limited to a particular configuration. Thus, the operations management server computer 116 may operate using a master/slave approach over a plurality of network computers, within a cluster, a peer-to-peer architecture, and/or any of a variety of other architectures.

In some embodiments, one or more data centers, such as a data center 118, may be communicatively coupled to the wireless network 110 and/or the network 111. In at least one of the various embodiments, the data center 118 may be a portion of a private data center, public data center, public cloud environment, or private cloud environment. In some embodiments, the data center 118 may be a server room/data center that is physically under the control of an organization. The data center 118 may include one or more enclosures of network computers, such as an enclosure 120 and an enclosure 122.

The enclosure 120 and the enclosure 122 may be enclosures (e.g., racks, cabinets, or the like) of network computers and/or blade servers in the data center 118. In some embodiments, the enclosure 120 and the enclosure 122 may be arranged to include one or more network computers arranged to operate as operations management server computers, monitoring server computers (e.g., the operations management server computer 116, the monitoring server computer 114, or the like), storage computers, or the like, or combination thereof. Further, one or more cloud instances may be operative on one or more network computers included in the enclosure 120 and the enclosure 122.

The data center 118 may also include one or more public or private cloud networks. Accordingly, the data center 118 may comprise multiple physical network computers, interconnected by one or more networks, such as networks similar to and/or the including network 111 and/or wireless network 110. The data center 118 may enable and/or provide one or more cloud instances (not shown). The number and composition of cloud instances may vary depending on the demands of individual users, cloud network arrangement, operational loads, performance considerations, application needs, operational policy, or the like. In at least one of the various embodiments, the data center 118 may be arranged as a hybrid network that includes a combination of hardware resources, private cloud resources, public cloud resources, or the like.

As such, the operations management server computer 116 is not to be construed as being limited to a single environment, and other configurations, and architectures are also contemplated. The operations management server computer 116 may employ processes such as described below in conjunction with at least some of the figures discussed below to perform at least some of its actions.

Figure 2:
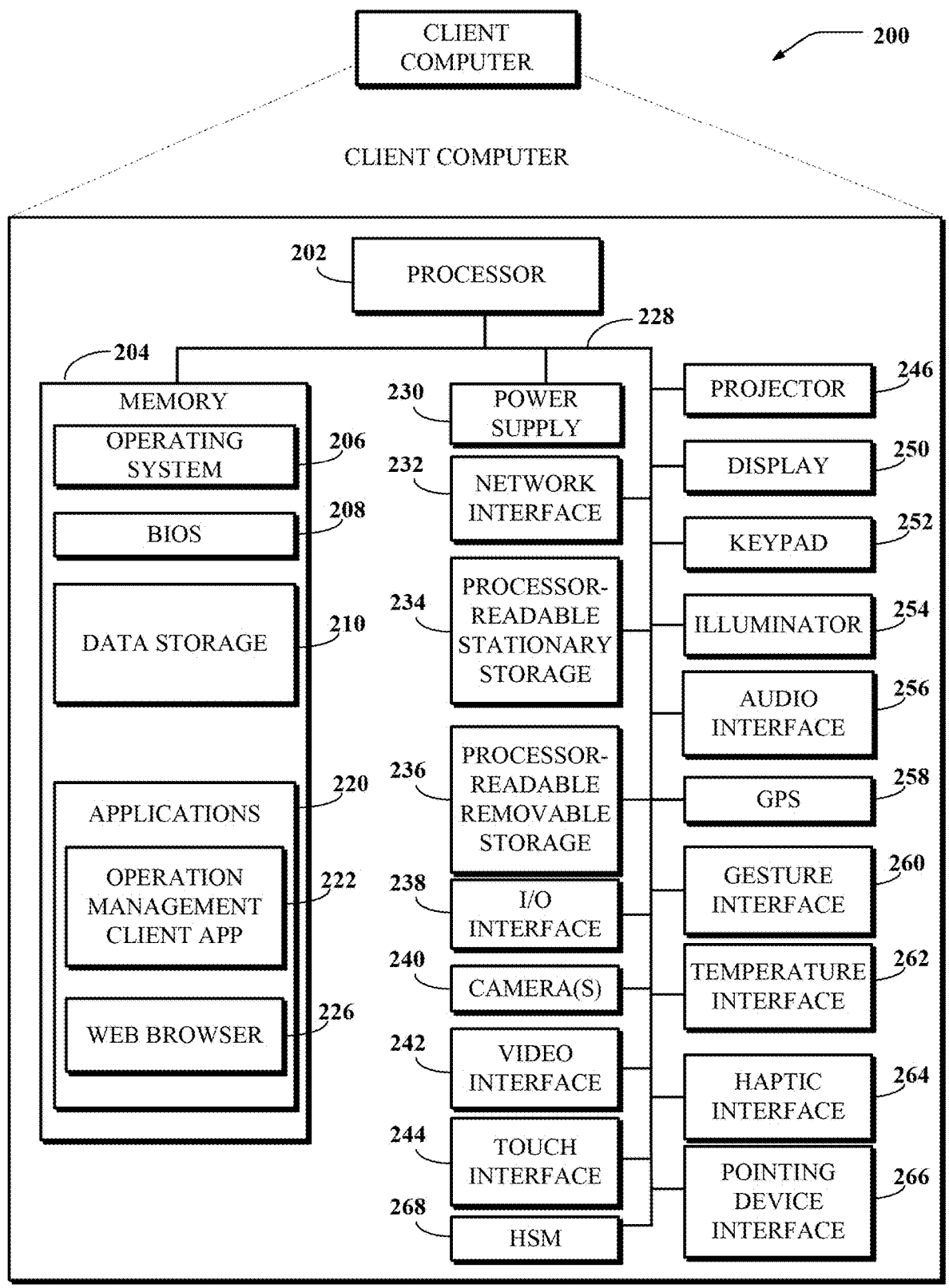
FIG. 2 shows an example of a client computer.

FIG. 2 shows one embodiment of a client computer 200. The client computer 200 may include more or less components than those shown in FIG. 2. The client computer 200 may represent, for example, at least one embodiment of mobile computers or client computers shown in FIG. 1.

The client computer 200 may include a processor 202 in communication with a memory 204 via a bus 228. The client computer 200 may also include a power supply 230, a network interface 232, an audio interface 256, a display 250, a keypad 252, an illuminator 254, a video interface 242, an input/output interface (i.e., an I/O interface 238), a haptic interface 264, a global positioning systems (GPS) transceiver (i.e., GPS transceiver 258), an open-air gesture interface 260, a temperature interface 262, a camera 240, a projector 246, a pointing device interface 266, a processor-readable stationary storage device 234, and a non-transitory processor-readable removable storage device 236. The client computer 200 may optionally communicate with a base station (not shown), or directly with another computer. And in one embodiment, although not shown, a gyroscope may be employed within the client computer 200 to measuring or maintaining an orientation of the client computer 200.

The power supply 230 may provide power to the client computer 200. A rechargeable or non-rechargeable battery may be used to provide power. The power may also be provided by an external power source, such as an AC adapter or a powered docking cradle that supplements or recharges the battery.

The network interface 232 includes circuitry for coupling the client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. The network interface 232 is sometimes known as a transceiver, transceiving device, or network interface card (NIC).

The audio interface 256 may be arranged to produce and receive audio signals such as the sound of a human voice. For example, the audio interface 256 may be coupled to a speaker and microphone (not shown) to enable telecommunication with others or generate an audio acknowledgement for some action. A microphone in the audio interface 256 can also be used for input to or control of the client computer 200, e.g., using voice recognition, detecting touch based on sound, and the like.

The display 250 may be a liquid crystal display (LCD), gas plasma, electronic ink, light emitting diode (LED), Organic LED (OLED) or any other type of light reflective or light transmissive display that can be used with a computer. The display 250 may also include a touch interface 244 arranged to receive input from an object such as a stylus or a digit from a human hand, and may use resistive, capacitive, surface acoustic wave (SAW), infrared, radar, or other technologies to sense touch or gestures.

The projector 246 may be a remote handheld projector or an integrated projector that is capable of projecting an image on a remote wall or any other reflective object such as a remote screen.

The video interface 242 may be arranged to capture video images, such as a still photo, a video segment, an infrared video, or the like. For example, the video interface 242 may be coupled to a digital video camera, a web-camera, or the like. The video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

The keypad 252 may comprise any input device arranged to receive input from a user. For example, the keypad 252 may include a push button numeric dial, or a keyboard. The keypad 252 may also include command buttons that are associated with selecting and sending images.

The illuminator 254 may provide a status indication or provide light. The illuminator 254 may remain active for specific periods of time or in response to event messages. For example, when the illuminator 254 is active, it may backlight the buttons on the keypad 252 and stay on while the client computer is powered. Also, the illuminator 254 may backlight these buttons in various patterns when particular actions are performed, such as dialing another client computer. The illuminator 254 may also cause light sources positioned within a transparent or translucent case of the client computer to illuminate in response to actions.

Further, the client computer 200 may also comprise a hardware security module (i.e., an HSM 268) for providing additional tamper resistant safeguards for generating, storing, or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, the HSM 268 may be a stand-alone computer, in other cases, the HSM 268 may be arranged as a hardware card that may be added to a client computer.

The I/O interface 238 can be used for communicating with external peripheral devices or other computers such as other client computers and network computers. The peripheral devices may include an audio headset, display screen glasses, remote speaker system, remote speaker, and microphone system, and the like. The I/O interface 238 can utilize one or more technologies, such as Universal Serial Bus (USB), Infrared, WiFi, WiMax, Bluetooth™, and the like.

The I/O interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the client computer 200.

The haptic interface 264 may be arranged to provide tactile feedback to a user of the client computer. For example, the haptic interface 264 may be employed to vibrate the client computer 200 in a particular way when another user of a computer is calling. The temperature interface 262 may be used to provide a temperature measurement input or a temperature changing output to a user of the client computer 200. The open-air gesture interface 260 may sense physical gestures of a user of the client computer 200, for example, by using single or stereo video cameras, radar, a gyroscopic sensor inside a computer held or worn by the user, or the like. The camera 240 may be used to track the physical eye movements of a user of the client computer 200.

The GPS transceiver 258 can determine the physical coordinates of the client computer 200 on the surface of the earth, which typically outputs a location as latitude and longitude values. The GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the client computer 200 on the surface of the earth. It is understood that under different conditions, the GPS transceiver 258 can determine a physical location for the client computer 200. In at least one embodiment, however, the client computer 200 may, through other components, provide other information that may be employed to determine a physical location of the client computer, including, for example, a Media Access Control (MAC) address, IP address, and the like.

Human interface components can be peripheral devices that are physically separate from the client computer 200, allowing for remote input or output to the client computer 200. For example, information routed as described here through human interface components such as the display 250 or the keypad 252 can instead be routed through the network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Bluetooth LE, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include a web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

The memory 204 may include RAM, ROM, or other types of memory. The memory 204 illustrates an example of computer-readable storage media (devices) for storage of information such as computer-readable instructions, data structures, program modules or other data. The memory 204 may store a BIOS 208 for controlling low-level operation of the client computer 200. The memory may also store an operating system 206 for controlling the operation of the client computer 200. It will be appreciated that this component may include a general-purpose operating system such as a version of UNIX, or LINUX™, or a specialized client computer communication operating system such as Windows Phone™, or IOS® operating system. The operating system may include, or interface with, a Java virtual machine module that enables control of hardware components or operating system operations via Java application programs.

The memory 204 may further include one or more data storage 210, which can be utilized by the client computer 200 to store, among other things, the applications 220 or other data. For example, the data storage 210 may also be employed to store information that describes various capabilities of the client computer 200. The information may then be provided to another device or computer based on any of a variety of methods, including being sent as part of a header during a communication, sent upon request, or the like. The data storage 210 may also be employed to store social networking information including address books, buddy lists, aliases, user profile information, or the like. The data storage 210 may further include program code, data, algorithms, and the like, for use by a processor, such as the processor 202 to execute and perform actions. In one embodiment, at least some of the data storage 210 might also be stored on another component of the client computer 200, including, but not limited to, the non-transitory processor-readable removable storage device 236, the processor-readable stationary storage device 234, or external to the client computer.

The applications 220 may include computer executable instructions which, when executed by the client computer 200, transmit, receive, or otherwise process instructions and data. The applications 220 may include, for example, an operations management client application 222. In at least one of the various embodiments, the operations management client application 222 may be used to exchange communications to and from the operations management server computer 116 of FIG. 1, the monitoring server computer 114 of FIG. 1, the application server computer 112 of FIG. 1, or the like. Exchanged communications may include, but are not limited to, queries, searches, messages, notification messages, events, alerts, performance metrics, log data, API calls, or the like, combination thereof.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), the client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the client computer 200 may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

FIG. 3 shows one embodiment of network computer 300 that may at least partially implement one of the various embodiments. The network computer 300 may include more or less components than those shown in FIG. 3. The network computer 300 may represent, for example, one embodiment of at least one EMB, such as the operations management server computer 116 of FIG. 1, the monitoring server computer 114 of FIG. 1, or an application server computer 112 of FIG. 1. Further, in some embodiments, the network computer 300 may represent one or more network computers included in a data center, such as, the data center 118, the enclosure 120, the enclosure 122, or the like.

As shown in the FIG. 3, the network computer 300 includes a processor 302 in communication with a memory 304 via a bus 328. The network computer 300 also includes a power supply 330, a network interface 332, an audio interface 356, a display 350, a keyboard 352, an input/output interface (i.e., an I/O interface 338), a processor-readable stationary storage device 334, and a processor-readable removable storage device 336. The power supply 330 provides power to the network computer 300.

The network interface 332 includes circuitry for coupling the network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. The network interface 332 is sometimes known as a transceiver, transceiving device, or network interface card (NIC). The network computer 300 may optionally communicate with a base station (not shown), or directly with another computer.

The audio interface 356 is arranged to produce and receive audio signals such as the sound of a human voice. For example, the audio interface 356 may be coupled to a speaker and microphone (not shown) to enable telecommunication with others or generate an audio acknowledgement for some action. A microphone in the audio interface 356 can also be used for input to or control of the network computer 300, for example, using voice recognition.

The display 350 may be a liquid crystal display (LCD), gas plasma, electronic ink, light emitting diode (LED), Organic LED (OLED) or any other type of light reflective or light transmissive display that can be used with a computer. The display 350 may be a handheld projector or pico projector capable of projecting an image on a wall or other object.

The network computer 300 may also comprise the I/O interface 338 for communicating with external devices or computers not shown in FIG. 3. The I/O interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, the I/O interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the network computer 300. Human interface components can be physically separate from network computer 300, allowing for remote input or output to the network computer 300. For example, information routed as described here through human interface components such as the display 350 or the keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through a pointing device interface 358 to receive user input.

A GPS transceiver 340 can determine the physical coordinates of network computer 300 on the surface of the Earth, which typically outputs a location as latitude and longitude values. The GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the network computer 300 on the surface of the Earth. It is understood that under different conditions, the GPS transceiver 340 can determine a physical location for the network computer 300. In at least one embodiment, however, the network computer 300 may, through other components, provide other information that may be employed to determine a physical location of the client computer, including, for example, a Media Access Control (MAC) address, IP address, and the like.

The memory 304 may include Random Access Memory (RAM), Read-Only Memory (ROM), or other types of memory. The memory 304 illustrates an example of computer-readable storage media (devices) for storage of information such as computer-readable instructions, data structures, program modules or other data. The memory 304 stores a basic input/output system (i.e., a BIOS 308) for controlling low-level operation of the network computer 300. The memory also stores an operating system 306 for controlling the operation of the network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

The memory 304 may further include a data storage 310, which can be utilized by the network computer 300 to store, among other things, applications 320 or other data. For example, the data storage 310 may also be employed to store information that describes various capabilities of the network computer 300. The information may then be provided to another device or computer based on any of a variety of methods, including being sent as part of a header during a communication, sent upon request, or the like. The data storage 310 may also be employed to store social networking information including address books, buddy lists, aliases, user profile information, or the like. The data storage 310 may further include program code, instructions, data, algorithms, and the like, for use by a processor, such as the processor 302 to execute and perform actions such as those actions described below. In one embodiment, at least some of the data storage 310 might also be stored on another component of the network computer 300, including, but not limited to, the non-transitory media inside processor-readable removable storage device 336, the processor-readable stationary storage device 334, or any other computer-readable storage device within the network computer 300 or external to network computer 300. The data storage 310 may include, for example, models 312, operations metrics 314, events 316, or the like.

The applications 320 may include computer executable instructions which, when executed by the network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. The applications 320 may be or include executable instructions, which can be loaded or copied, in whole or in part, from non-volatile memory to volatile memory to be executed by the processor 302. For example, the applications 320 can include instructions for performing some or all of the techniques of this disclosure. In at least one of the various embodiments, one or more of the applications may be implemented as modules or components of another application. Further, in at least one of the various embodiments, applications may be implemented as operating system extensions, modules, plugins, or the like.

Furthermore, in at least one of the various embodiments, at least some of the applications 320 may be operative in a cloud-based computing environment. In at least one of the various embodiments, these applications, and others, which include the management platform may be executing within virtual machines or virtual servers that may be managed in a cloud-based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to at least some of the applications 320 may be provisioned and de-commissioned automatically.

In at least one of the various embodiments, the applications may be arranged to employ geo-location information to select one or more localization features, such as time zones, languages, currencies, calendar formatting, or the like. Localization features may be used in user-interfaces as well as internal processes or databases. Further, in some embodiments, localization features may include information regarding culturally significant events or customs (e.g., local holidays, political events, or the like) In at least one of the various embodiments, geo-location information used for selecting localization information may be provided by the GPS transceiver 340. Also, in some embodiments, geolocation information may include information providing using one or more geolocation protocol over the networks, such as, the wireless network 110 or the network 111.

Also, in at least one of the various embodiments, at least some of the applications 320, may be located in virtual servers running in a cloud-based computing environment rather than being tied to one or more specific physical network computers.

Further, the network computer 300 may also comprise hardware security module (i.e., an HSM 360) for providing additional tamper resistant safeguards for generating, storing, or using security/cryptographic information such as, keys, digital certificates, passwords, passphrases, two-factor authentication information, or the like. In some embodiments, a hardware security module may be employed to support one or more standard public key infrastructures (PKI), and may be employed to generate, manage, or store keys pairs, or the like. In some embodiments, the HSM 360 may be a stand-alone network computer, in other cases, the HSM 360 may be arranged as a hardware card that may be installed in a network computer.

Additionally, in one or more embodiments (not shown in the figures), the network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Figure 4:
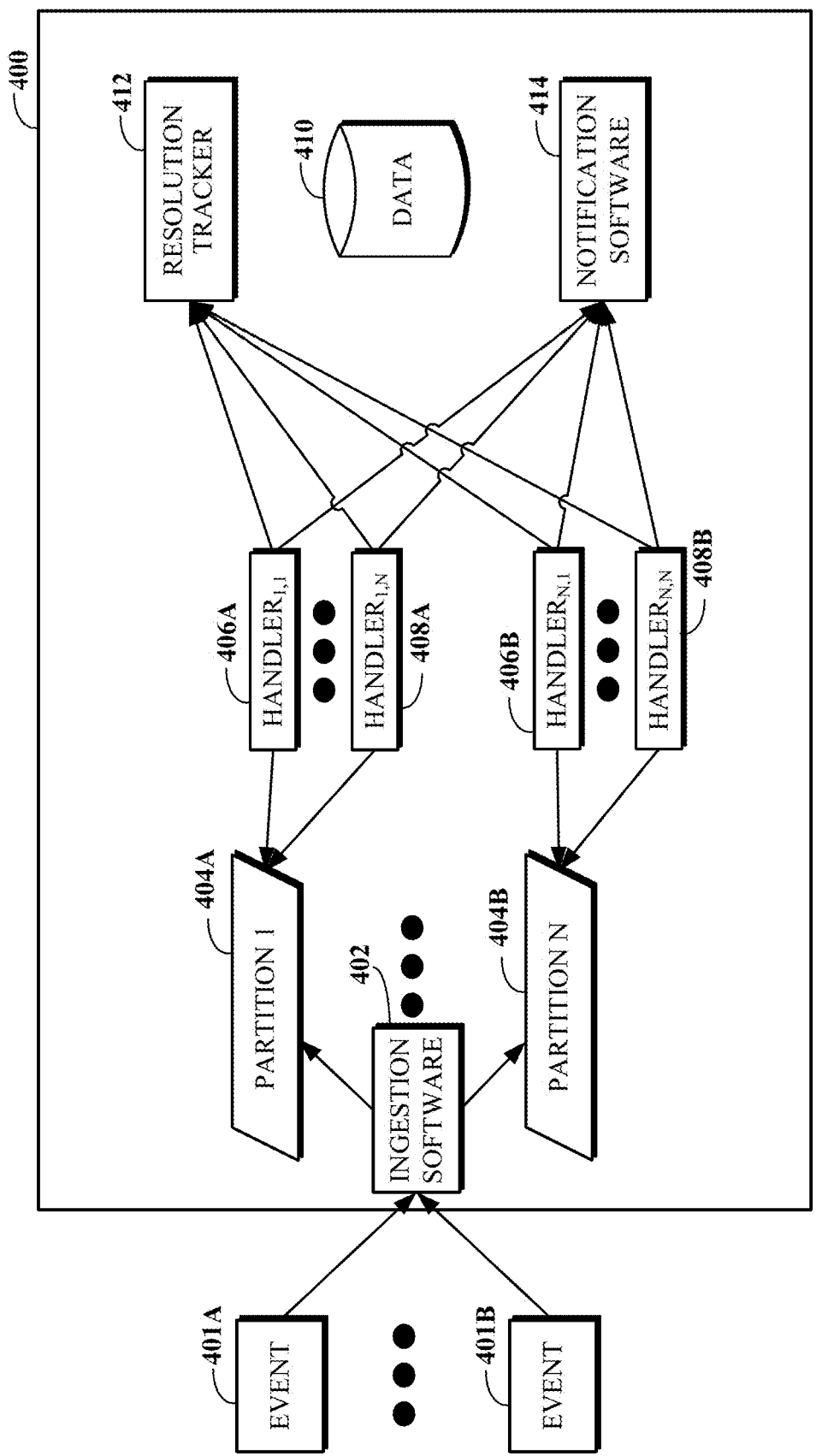
FIG. 4 illustrates a logical architecture of a system for generating event related messages for use in determining dependencies among services using a relationship network graph.

FIG. 4 illustrates a logical architecture of a system 400 for monitoring service-related events. In at least one of the various examples that will be described, a system for determining service dependencies can use information provided by a system for monitoring service-related events, such as the system 400 of FIG. 4. In this example, the system 400 includes an ingestion software 402, one or more partitions 404A-404B, one or more handlers 406A-406B and 408A-408B, a data store 410, a resolution tracker 412, and a notification software 414.

One or more systems, such as monitoring systems, of one or more organizations may be configured to transmit events to the system 400 for processing. The system 400 may provide several services. A handler may, for example, process an event and determine whether a downstream object (e.g., a service incident) is to be triggered. As mentioned above, a received event may trigger an alert, which may trigger a service incident, which in turn may cause notifications to be transmitted to responders.

A received event from an organization may include an indication of one or more services that are to operate on (e.g., process, etc.) the event. The indication of the service is referred to herein as a routing key. A routing key may be unique to a managed organization. As such, two events that are received from two different managed organizations for processing by a same service would include two different routing keys. A routing key may be unique to the service that is to receive and process an event. As such, two events associated with two different routing keys and received from the same managed organization for processing may be directed to (e.g., processed by) different services.

The ingestion software 402 may be configured to receive or obtain different types of events provided by various sources, here represented by events 401A, 401B. The ingestion software 402 may be configured to accept or reject received events. In an example, events may be rejected when events are received at a rate that is higher than a configured event-acceptance rate. If the ingestion software 402 accepts an event, the ingestion software 402 may place the event in a partition (such as one of the partitions 404A, 404B) for further processing. If an event is rejected, the event is not placed in a partition for further processing. The ingestion software may notify the sender of the event of whether the event was accepted or rejected. Grouping events into partitions can be used to enable parallel processing and/or scaling of the system 400 so that the system 400 can handle (e.g., process, etc.) more and more events and/or more and more organizations (e.g., additional events from additional organizations).

The ingestion software 402 may be arranged to receive the various events and perform various actions, including, filtering, reformatting, information extraction, data normalizing, or the like, or combination thereof, to enable the events to be stored (e.g., queued, etc.) and further processed. In at least one of the various embodiments, the ingestion software 402 may be arranged to normalize incoming events into a unified common event format. Accordingly, in some embodiments, the ingestion software 402 may be arranged to employ configuration information, including, rules, maps, dictionaries, or the like, or combination thereof, to normalize the fields and values of incoming events to the common event format. The ingestion software 402 may assign (e.g., associate, etc.) an ingested timestamp with an accepted event.

In at least one of the various embodiments, an event may be stored in a partition, such as one of the partition 404A or the partition 404B. A partition can be, or can be thought of, as a queue (e.g., a first-in-first-out queue) of events. FIG. 4 is shown as including two partitions (i.e., the partitions 404A and 404B). However, the disclosure is not so limited and the system 400 can include one or more than two partitions.

In an example, different handlers of the system 400 may be configured to operate on events of the different partitions. In an example, the same handlers (e.g., identical logic) may be configured to operate on the accepted events in different partitions. To illustrate, in FIG. 4, the handlers 406A and 408A process the events of the partition 404A, and the handlers 406B and 408B process the events of partition the 404B, where the handler 406A and the handler 406B execute the same logic (e.g., perform the same operations) of a first handler but on different physical or virtual servers; and the handler 408A and the handler 408B execute the same logic of a second handler but on different physical or virtual servers. In an example, different types of events may be routed to different partitions. As such, each of the handlers 406A-406B and 408A-408B may perform different logic as appropriate for the events processed by the handler.

An (e.g., each) event may also be associated with one or more handlers that may be responsible for processing the events. As such, an event can be said to be addressed or targeted to the one or more handlers that are to process the event. As mentioned above, an event can include or can be associated with a routing key that indicates the one or more handlers that are to receive the event for processing.

Events may be variously formatted messages that reflect the occurrence of events or service incidents that have occurred in the computing systems or infrastructures of one or more managed organizations. Such events may include facts regarding system errors, warning, failure reports, customer service requests, status messages, or the like. One or more external services, at least some of which may be monitoring services, may collect events and provide the events to the system 400. Events as described above may be comprised of, or transmitted to the system 400 via, SMS messages, HTTP requests/posts, API calls, log file entries, trouble tickets, emails, or the like. An event may include associated metadata, such as, a title (or subject), a source, a creation time stamp, a status indicator, a region, more information, fewer information, other information, or a combination thereof, that may be tracked. In an example, the event data may be received as a structured data, which may be formatted using JavaScript Object Notation (JSON), XML, or some other structured format. The metadata associated with an event is not limited in any way. The metadata included in or associated with an event can be whatever the sender of the event deems required.

In at least one of the various embodiments, a data store 410 may be arranged to store performance metrics, configuration information, or the like, for the system 400. In an example, the data store 410 may be implemented as one or more relational database management systems, one or more object databases, one or more XML databases, one or more operating system files, one or more unstructured data databases, one or more synchronous or asynchronous event or data buses that may use stream processing, one or more other suitable non-transient storage mechanisms, or a combination thereof. The data store 410 can be used to store information (i.e., ownership information) associating services with entities and organizations that own services. Thus, the system 400 can identify an organization and/or an entity associated with a service given the identification of the service, or identify service associated with an organization or an entity given an identify of the organization or entity. In an example, user interfaces of the system 400 may be used to populate ownership information in the data store 410. The data store 410 can also be used to store service dependencies that are derived as described herein.

Data related to events, alerts, service incidents, notifications, other types of objects, or a combination thereof may be stored in the data store 410. For example, the data store 410 can include data related to resolved and unresolved alerts. For example, the data store 410 can include data identifying whether alerts are or are not acknowledged. For example, with respect to a resolved alert, the data store 410 can include information regarding the resolving entity that resolved the alert (and/or, equivalently, the resolving entity of the event that triggered the alert), the duration that the alert was active until it was resolved, other information, or a combination thereof. The resolving entity can be a responder (e.g., a human). The resolving entity can be an integration (e.g., automated system), which can indicate that the alert was auto resolved. That the alert is auto resolved can mean that the system 400 received, such as from the integration, an event indicating that a previous event, which triggered the alert, is resolved. The integration may be a monitoring system.

In at least one of the various embodiments, the resolution tracker 412 may be arranged to monitor the details regarding how events, alerts, service incidents, other objects received, created, managed by the system 400, or a combination thereof are resolved. In some embodiments, this may include tracking service incident and/or alert life-cycle metrics related to the events (e.g., creation time, acknowledgement time(s), resolution time, processing time), the resources that are/were responsible for resolving the events, the resources (e.g., the responder or the automated process) that resolved alerts, and so on. The resolution tracker 412 can receive data from the different handlers that process events, alerts, or service incidents. Receiving data from a handler by the resolution tracker 412 encompasses receiving data directly from the handler and/or accessing (e.g., polling for, querying for, asynchronously being notified of, etc.) data generated (e.g., set, assigned, calculated by, stored, etc.) by the handler. The resolution tracker can receive (e.g., query for, read, etc.) data from the data store 410. The resolution tracker can write (e.g., update, etc.) data in the data store 410.

While FIG. 4 is shown as including one resolution tracker 412, the disclosure herein is not so limited and the system 400 can include more than one resolution tracker. In an example, different resolution trackers may be configured to receive data from handlers of one or more partitions. In an example, each partition may have associated with one resolution tracker. Other configurations or mappings between partitions, handlers, and resolution trackers are possible.

The notification software 414 may be arranged to generate notification messages for at least some of the accepted events. The notification messages may be transmitted to responders (e.g., responsible users, teams) or automated systems. The notification software 414 may select a messaging provider that may be used to deliver a notification message to the responsible resource. The notification software 414 may determine which resource is responsible for handling the event message and may generate one or more notification messages and determine particular message providers to use to send the notification message.

In at least one of the various embodiments, a scheduler (not shown) may determine which responder is responsible for handling a service incident based on at least an on-call schedule and/or the content of the service incident. The notification software 414 may generate one or more notification messages and determine a particular message provider to use to send the notification message. Accordingly, the selected message providers may transmit (e.g., communicate, etc.) the notification message to the responder. Transmitting a notification to a responder, as used herein, and unless the context indicates otherwise, encompasses transmitting the notification to a team or a group. In some embodiments, the message providers may generate an acknowledgment message that may be provided to system 400 indicating a delivery status of the notification message (e.g., successful or failed delivery).

In at least one of the various embodiments, the notification software 414 may determine the message provider based on a variety of considerations, such as, geography, reliability, quality-of-service, user/customer preference, type of notification message (e.g., SMS or Push Notification, or the like), cost of delivery, or the like, or combination thereof. In at least one of the various embodiments, various performance characteristics of each message provider may be stored and/or associated with a corresponding provider performance profile. Provider performance profiles may be arranged to represent the various metrics that may be measured for a provider. Also, provider profiles may include preference values and/or weight values that may be configured rather than measured.

In at least one of the various embodiments, the system 400 may include various user-interfaces or configuration information (not shown) that enable organizations to establish how events should be resolved. Accordingly, an organization may define rules, conditions, priority levels, notification rules, escalation rules, routing keys, or the like, or combination thereof, that may be associated with different types of events. For example, some events (e.g., of the frequent type) may be informational rather than associated with a critical failure. Accordingly, an organization may establish different rules or other handling mechanics for the different types of events. For example, in some embodiments, critical events (e.g., rare, or novel events) may require immediate (e.g., within the target lag time) notification of a response user to resolve the underlying cause of the event. In other cases, the events may simply be recorded for future analysis.

In an example, one or more of the user interfaces may be used to associate runbooks with certain types of objects, such as alerts. A runbook can include a set of actions that can implement or encapsulate a standard operating procedure for responding to (e.g., remediating, etc.) events of certain types. Runbooks can reduce toil. Toil can be defined as the manual or semi-manual performance of repetitive tasks. Toil can reduce the productivity of responders (e.g., operations engineers, developers, quality assurance engineers, business analysts, project managers, and the like) and prevents them from performing other value-adding work. In an example, a runbook may be associated with a template. As such, if an alert matches the template, then the tasks of the runbook can be performed (e.g., executed, orchestrated, etc.) according to the order, rules, and/or workflow specified in the runbook. In another example, the runbook can be associated with a type. As such, if an alert is identified as being of a certain type, then the tasks of the runbook associated with the certain type can be performed. A runbook can be assembled from predefined actions, custom actions, other types of actions, or a combination thereof.

In an example, one or more of the user interfaces may be used by responders to obtain information regarding objects and/or groups of objects. For example, a responder can use one of the user interfaces to obtain information regarding service incidents assigned to or acknowledged by the responder. A user interface can be used to obtain information about a service incident including the events (i.e., the group of events) associated with the service incident. In an example, the responder can use the user interface to obtain information from the system 400 regarding the reason(s) a particular event was added to the group of events.

At least one of the handlers 406A-406B and 408A-408B may be configured to trigger alerts. A handler can also trigger a service incident from an alert, which in turn can cause notifications to be transmitted to one or more responders.

Figure 5:
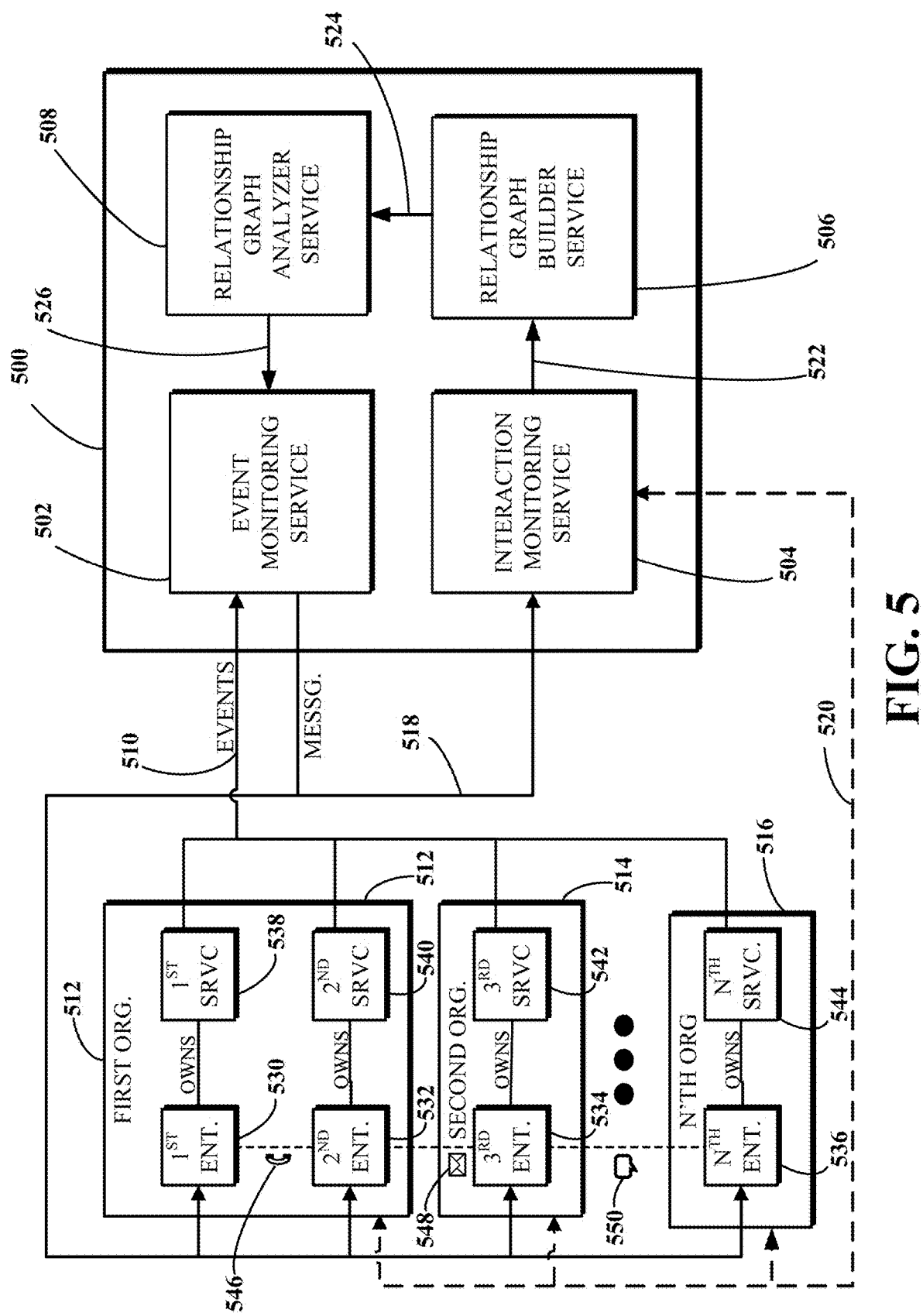
FIG. 5 is a block diagram of a system for determining service dependencies using a relationship network graph.

FIG. 5 illustrates a logical architecture of a system 500 for determining service dependencies. The system 500 include an event monitoring service 502, which can be the system 400 of FIG. 4, an interaction monitoring service 504, a relationship network graph builder service 506, and a relationship network graph analyzer service 508. The services of the system 500 may be implemented by computer hardware or software such as that described in relation to FIGS. 1-4. In some implementations, the services may be provided by more than one computer system. In other implementations, the services may be implemented using a single computer system. The event monitoring service 502 monitors service-related events 510 of organizations as described previously, including a first organization 512, a second organization 514, and continuing to an Nth organization 516.

The event monitoring service 502 can generate event related messages 518, such as an alert that can be sent to an owner of a service associated with the events that triggered the alert, such as entities 530-536 which own services 538-544 (e.g., services 538, 540, 542, 544), respectively. Although FIG. 5 illustrates each organization including an entity owning a service in the organization, in some implementations an owner of a service can be external to an organization. For example, two organizations collaborating on a service can have an entity that owns the service. The services 538-544 can communicate with other services which may be indicative of dependencies. The communication between the services as illustrated by the dashed lines between services, such as the dashed line between the first service 538 and the second service 540. The event monitoring service 502 may send the event related message 518 to a service owner who owns a service associated with the alert. In some instances, the organization may receive the alert and deliver the alert to the owner of the service. The interaction monitoring service 504 obtains communication records 520 describing interactions between entities, such as a phone call 546 between the $1^{st}$ entity 530 and the $2^{nd}$ entity 532, an email 548 between the $2^{nd}$ entity 532 and the $3^{rd}$ entity 534, and a text message 550 between the $3^{rd}$ entity 534 and the Nth entity 536, and can include the event related messages 518 sent to the entities. The interaction monitoring service 504 organizes the information in the communication records to generate interaction information 522. The operation of the interaction monitoring service 504 will be described in more detail in relation to FIG. 6. The interaction monitoring service 504 generates the interaction information 522 and provides the interaction information 522 to the relationship network graph builder service 506 to build a new relationship network graph or augment an existing relationship network graph representing relationships between the entities. The relationship network graph builder service 506 provides relationship network graph information 524 to the relationship network graph analyzer service 508, which determines the strength of relationships between entities based on the relationship network graph information 524. The relationships between entities are then used to associate services owned by related entities as having a dependent relationship. Dependency information 526 representing the dependent relationships can be transmitted by the relationship network graph analyzer service 508 to the event monitoring service 502 to group event related messages, pause event related messages, or produce secondary event related messages based on the dependency information 526.

The dependency information can be provided to other systems beside the event monitoring service 502. In some implementations, the system 500 for determining service dependencies can provide a tool to the organizations or entities for providing a visual depiction of service dependencies to the organizations or entities, which may be integrated with other applications provided by the system 500. In some implementations, the organizations or the event monitoring service can use the dependency information to alert dependent services of a change in service at one of the related services. For instance, if a first service is going down or undergoing a change, the dependency information can be used to identify dependent services and an alert can be sent to the dependent service owners. Or, in another implementation, if a service experiences a breach, the dependency information can be used to identify dependent services and send an alert to the dependent service owners of the breach.

FIG. 6 illustrates an example of interaction information in the form of an interaction information dataset 600, which may be generated by an interaction monitoring service, such as the interaction monitoring service 504 of FIG. 5. The interaction monitoring service generates an interaction information dataset such as the interaction information dataset 600 of FIG. 6 by compiling interaction records of organizations, such as the organizations 512-516 of FIG. 5. The interaction information dataset can be thought of as an organized set of the interaction information 522, such as by organizing the interaction information 522 in chronological order or according to some other criteria. The interaction information dataset 600 can be augmented with other information to provide context about the interaction records such as current service incidents, recent alerts, major events impacting an organization, or other information. For example, the interaction information dataset 600 of FIG. 6 includes alert records at rows 614 and 636 that may be generated by an event monitoring service to provide alert related context. The interaction information dataset 600 as shown in the example of FIG. 6 is a simplified example to assist in explaining implementations of discovering service dependencies based on interaction information. In an actual implementation, the interaction information dataset 600 can be much larger with many more entities and additional interactions.

The interaction information dataset 600 of FIG. 6 is displayed as a table with information about each interaction stored as a row in the table. A first column 602 of the table stores a time that an interaction occurred, a second column 604 stores an indication of a source entity of the interaction, a third column 606 stores a description of the interaction, a fourth column 608 stores an indication of a destination entity of the interaction, and a fifth column 610 stores a weight to assign to the interaction record. The table format and column descriptions of the interaction information dataset 600 FIG. 6 are merely exemplary, and implementations of an interaction information dataset are not limited to this format. In some instances, the interaction information dataset may contain less information (e.g., fewer columns) for each interaction record. For example, an interaction information dataset may omit a description of the interaction. In other instances, an interaction information dataset may store additional information, i.e., more columns, such as metadata providing context for the interaction. Additionally, while the interaction information dataset 600 of FIG. 6 includes event related messages sent by an event monitoring service, in other implementations, the interaction information dataset may separate interactions between entities and event related messages from an event monitoring service.

In some implementations, interaction records may be provided by a service of an organization to an interaction monitoring service, i.e., a service of an organization may push information to an interaction monitoring service. For instance, an interaction monitoring service may have a secure portal that personnel of an organization can upload message logs to. Alternatively, or additionally, in some instances, an interaction transmission software associated with (e.g., deployed by) an organization can forward interaction records to an interaction monitoring service. In an example, metadata regarding the interactions (and not the contents of the interactions), may be forwarded as interaction records. In an example, the interaction records are forwarded to the system 500 as interactions occur. In another example, interactions records are forwarded to the system 500 in batches (e.g., on a schedule). In other implementations, an organization may grant the event monitoring service access to communication records of the organization so that the interaction monitoring service may retrieve records of interactions from the information system of an organization, i.e., an interaction monitoring service may pull information from a database of an organization. More accurately, an interaction monitoring service may retrieve records from communication tools or software used by the organization. For instance, an organization's technology infrastructure may make interaction records available at an interface and an interaction monitoring service can scrape the interface to retrieve the interaction records. In some implementations, both push techniques and pull techniques can be used depending on preferences. In still other implementations, a forwarding agent may be located at an organization to forward interaction records to the interaction monitoring service. The forwarding agent may be a software component implemented by the organization's infrastructure, or it can be a hardware component installed at the organization.

In some implementations, the interaction records can be derived from communications such as email messages, chat messages, calendaring information, telephone call logs, and the like. For instance, a communication (e.g., an email message) can be stripped of content and other sensitive information so that only pertinent interaction information remains. The remaining information can be used to build or enhance a previously generated relationship network graph so long as the remaining information includes the source and the destination of the interaction. In some instances, an organization providing the interaction information can generate the interaction records before an interaction monitoring service receives the interaction information. In other instances, an interaction monitoring service can receive raw interaction information, such as complete emails, and strip the raw interaction information of sensitive information to generate interaction records after receiving the raw interaction information.

In some implementations, the content of the interaction can be used to identify a service associated with the message, to generate a weight for the interaction, and/or provide context for the interaction. For instance, the text of an email may be processed using a machine learning model to identify relationships between the text of the email and services. The machine learning model can be trained using past relationships of messages and services. In some instances, the machine learning model may be unsupervised to identify potential grouping of interactions. In some instances, the machine learning model may be supervised to identify relationships to known services.

Other sources of interactions are possible, such as access logs indicating that an entity accessed content related to another entity, web logs indicating that an entity viewed a website related to another entity, position information indicating that entities are in close proximity, or other information recording potential interactions between entities. To illustrate, a first entity may own a first service and may provide online documentation describing the first service, and a second entity that owns a second service may have reviewed such documentation. Log entries (such as web server logs) may indicate that the second entity accessed the online documentation. Such access can be indicative of a dependency between the first service and the second service.

An interaction information dataset containing interaction records across multiple organizations can be used to identify dependencies that may lie outside of the structure of an organization. In general, the confidence of a relationship determined using a relationship network graph grows as more relevant information is added to the relationship network graph. However, organizations may prefer that their interaction records not be co-mingled with interaction records of other organizations. In such instances the interaction records from concerned organizations can be siloed so that service dependencies for concerned organizations only take into account interaction records from the concerned organization. In other instances, the interaction records from multiple organizations may be aggregated into a multi-organization interaction information data source.

In some implementations, an interaction record can be assigned a weight based on how related the respective interaction is to a service or according to some other defined criteria. The weight may serve as a proxy for the relative likelihood that the interaction is related to a service dependency. For example, interactions that are directly related to a service (e.g., a meeting to discuss the service) can be assigned a higher weight while interactions with no identifiable relationship (e.g., a lunch invitation) may be assigned a lower weight. To illustrate, a meeting prior to a triggered alert is unlikely to be useful in identifying service dependencies based on the alert. The determination of a weight to assign to an interaction record can vary according to preferences or rules implemented by a system for determining service dependencies. The rules can be defined by an organization, a provider of EMB services, or another organization. Additionally, the rules may change depending on past experience and observations. For instance, if a rule does not appear to accurately represent the importance of a type of interaction, the rule can be updated, and a new weight assigned to the interaction record.

A weight for an interaction record can be based on a variety of features of an interaction, such as the context of the interaction. A feature of an interaction can be any piece of information that provides more detail about the interaction and that can be used in determining weights. For instance, a weight assigned to an interaction record can be at least partially dependent on a type of interaction, the proximity of the interaction to a service incident or alert, the number of interactions between entities, the time of day the interaction occurs, the entities involved in the interaction, or combinations of the same. In the example interaction information dataset 600 of FIG. 6, the weights are based on the temporal proximity of the interaction to a received event (such as one of the events 401A or 401B of FIG. 4), the time of day of the interaction, and whether either the source entity or the destination entity is related to a previous event related message.

For example, the interaction record in row 612 corresponds to a telephone call between entity B and entity E on May 3. There is no other relevant information given in the interaction record. This interaction record may be assigned a low weight since there are not any prior event related messages and the time of day is during normal working hours. Although there is an event related message at row 614 that occurs later, in this example, event related messages are not considered if the event related message is sent after the interaction. In other implementations, event related message occurring after an interaction may be considered. For instance, if a service incident is closed following an interaction, there may be a greater likelihood that the interaction was related to the service incident.

Row 614 corresponds to an event related message sent at 10:25 to entity B in the form of an alert providing information about a service incident. Subsequent communications are more likely to be related to a service and can be assigned a higher weight, particularly if they involve entity B. The next communication record at row 616, can be assigned a high weight since the communication occurs at a time proximate to the alert sent to entity B and the communication involves entity B. The communication record at row 618 indicates that at 12:15 entity B assigned the service incident to entity C. This interaction can be assigned a high weight since it involves entity B and is directly related to a service incident.

The interactions recorded in the records at rows 620 and 622 can be given a low weight, since it has been over 2 hours since the event related message was sent, and the entities involved in the communication were not involved in the previous service incident. Similarly, the interactions records at rows 628 and 634 can be assigned a low weight since the respective interactions are not related to an event. The interaction record at row 626 can be assigned a high weight since it involves entity E communicating with entity A, and entity E was previously involved in interactions following the service incident alert sent to entity B, suggesting potential service-related coordination.

The interaction record of row 630 can be assigned a medium weight, since it is related to entity B which previously received the service incident related message, but it has been nearly 8 hours since the message was sent. The interaction record of row 638 can be assigned a media weight since it occurs proximate a service incident related message at row 638, but the event related message is not sent to either of the entities.

The remaining interaction records at rows 632 and 640 can each be assigned a high weight. The interaction associated with row 632 can be assigned a high weight since it occurs outside of normal business hours. The interaction associated with row 640 can be assigned a high weight since it involves an entity that received an event related message in row 636.

The assignment of weights as described is exemplary and other criteria and methods may be used. In some implementations, no weights are assigned, and each interaction can be given the same weight. Additionally, as will be described in relation to the FIGS. 7A-7F, weights can be assigned or augmented based on existing edges in the relationship network graph.

FIG. 7A-7E illustrate an example of building a relationship network graph 700 based on the communication records shown in FIG. 6. The relationship network graph 700 can be generated by a relationship network graph generation service, such as the relationship network graph builder service 506 of FIG. 5. The described example is a simplified version of a process, and other algorithms may be used. Additionally, the assignment of edge weights can be performed using a different technique. In the example of FIGS. 7A-7E, the assignment of edge weights is cumulative, with each new interaction having its weight added to the weight of an existing edge. For the purpose of this example, low weighted interaction records are assigned a weight of 1, medium weighted interaction records are assigned a weight of 2, and high weighted interaction records are assigned a weight of 3. This will be shown in the following example.

Figure 7A:
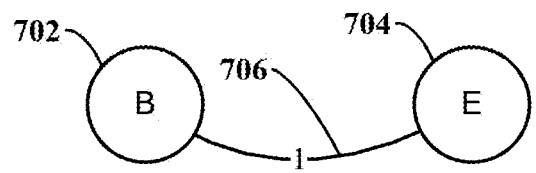
FIGS. 7A-7F are examples of building a relationship network graph.

The relationship network graph 700 at FIG. 7A includes two nodes (i.e., nodes 702, 704) representing entity B and entity E and an edge 706 representing the interaction represented by row 612 in FIG. 6. The edge 706 is assigned a weight of 1 corresponding to the weight of the interaction record.

Figure 7B:
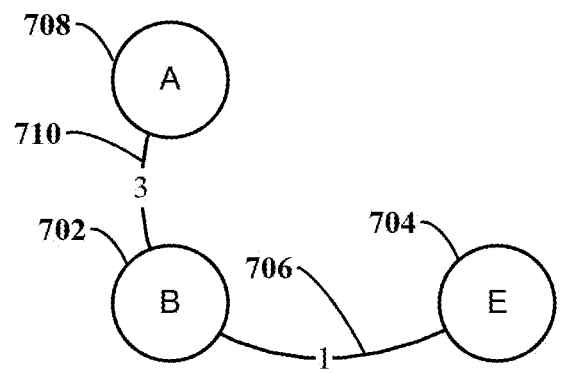

The relationship network graph 700 at FIG. 7B includes a node 708 representing entity A and an edge 710 between node 702 and node 708. The edge 710 is assigned a weight of 3 based on the weight of the interaction action represented by row 616 in FIG. 6. Additionally, edge 709 of FIG. 7B connects node 708 (entity A) with the node representing entity D, based on the interaction record showing communication between these entities as reflected in the interaction information dataset.

Figure 7C:
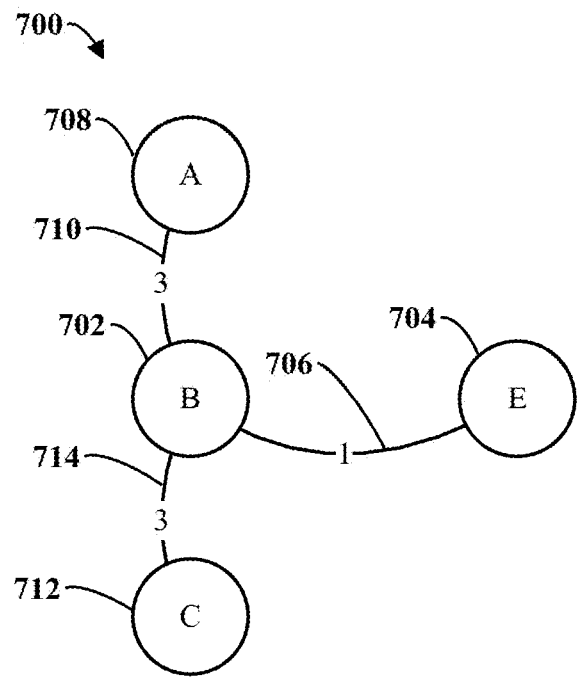
Figure 7D:
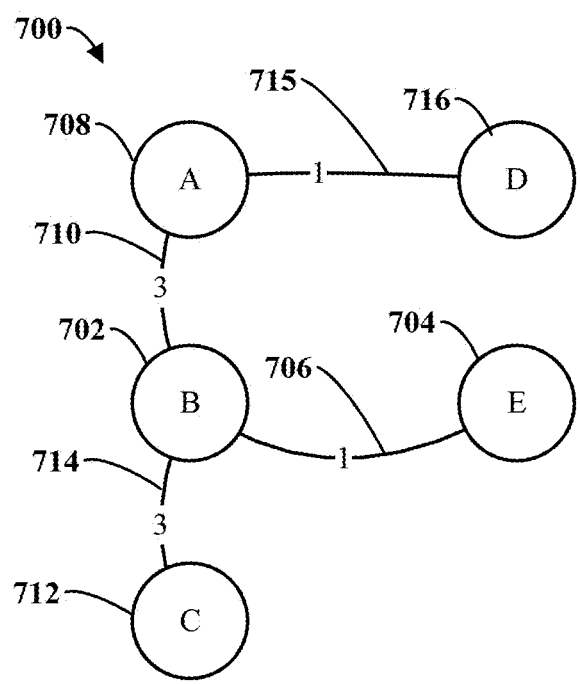

The relationship network graph 700 at FIG. 7C includes node 712 representing entity C connected to node 702 by edge 714 representing the interaction represented by row 618 in FIG. 6. FIG. 7D illustrates node 716 added with edge 715 connecting node 708 and node 716 as represented in row 620 in FIG. 6.

Figure 7E:
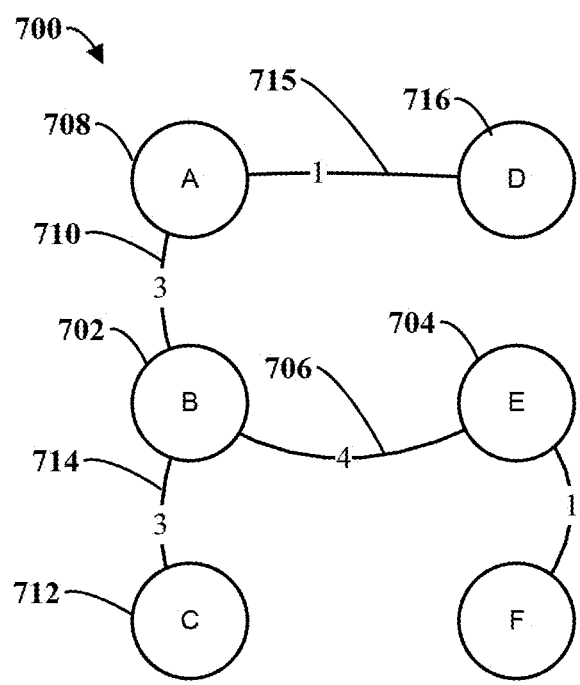
Figure 7F:
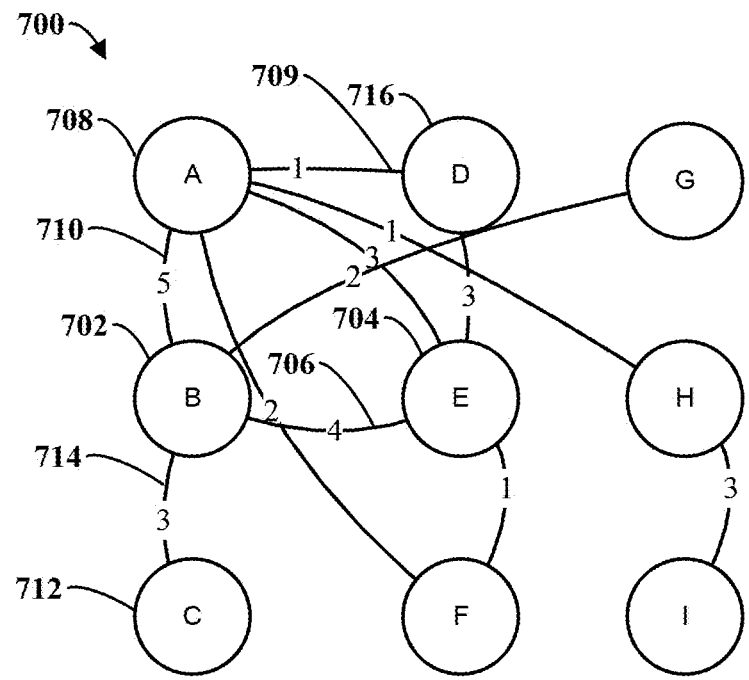

Building the relationship network graph continues in this manner and at FIG. 7E, edge 706 is updated to have a weight of 4 to include the interaction of row 612 with a weight of 1 and the interaction of row 624 with a weight of 3. This process is continued until the result of FIG. 7F is built. Of note, the relationship network graph shown in FIG. 7F is a visual representation. The actual data structure stored by a computing device can be a multidimensional matrix or other data structure. The actual data structure can be stored in a data store, such as the data store 410 of FIG. 4.

The relationship graph building service provides the relationship network graph to a relationship graph analyzer service to determine relationships in the relationship network graph. The relationship network graph can be analyzed to identify information such as graph communities, which may represent interrelated nodes; a center of the graph, which may represent importance of a node; and distances between nodes, which can be used as proxies for relatedness. There are different algorithms and techniques available to find this information. For example, relatedness may be found using shortest path algorithms, neighborhood-based algorithms, total neighbor algorithms, and other algorithms.

A simple path algorithm that uses a weighted path algorithm will be described in relation to node F. The algorithm can be performed for each node to determine which of the other nodes are related. Each node that scores higher than a threshold is considered to be related. For example, the relatedness between node A and C can be found as a sum of all non-repeating paths between A and C, where a path weight is equal the sum of the weight of the edges divided by the number of edges. Path ABC has a score of (5+3)/2 or 4. There is no other path that does use segment BC so 4 is the final score. The relatedness between A and D can be found as the sum of path AD and AED or AD and ABED, whichever is greater. Thus, the relatedness of A and D is 1+(3+3)/2=4 or 1+(5+4+3)/3=5. Since 5 is greater than 4, it is selected as the relatedness. These results show that A and D have a stronger relationship than A and C. If a cutoff of greater than 4 is selected as a criterion for relatedness, the interaction relationship diagram suggests that A and D are related, while A and C are not.

The relatedness of each node can be calculated using the techniques described or another algorithm and a data structure identifying the relationships is generated based on the results of the algorithm. Each entity is associated with a service, and based on the relationships of the entities, the services can be identified as related. This information can be provided to organizations to help them make informed decisions regarding services. Additionally, an event management system can use the information to notify dependent services if there is a problem with a related service that may affect it.

Figure 8:
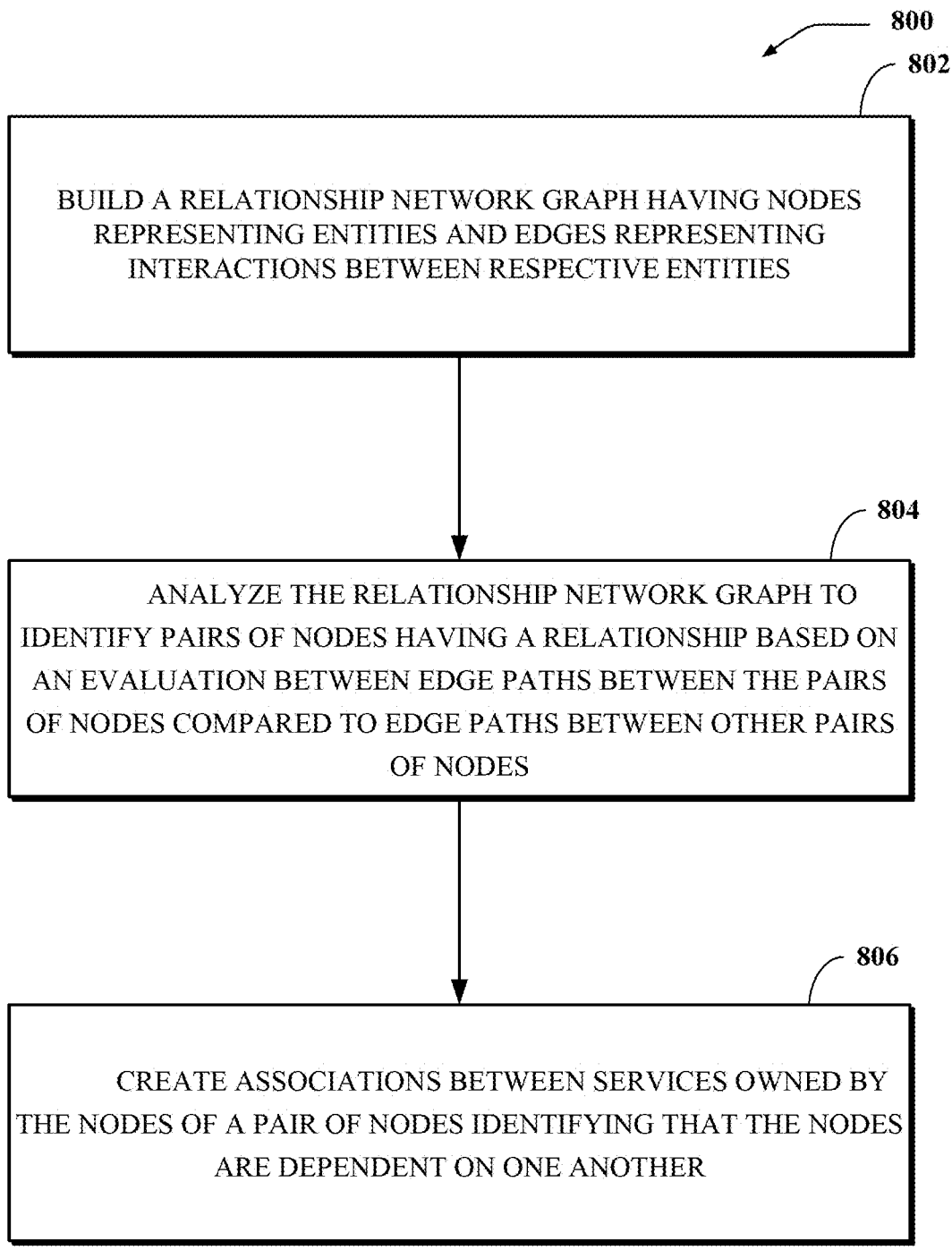
FIG. 8 is a block diagram of a flowchart of a technique for determining service dependencies using a relationship network graph.

To further describe some implementations in greater detail, reference is next made to examples of techniques which may be performed by or using a conference controller. FIG. 8 is a flowchart of an example of a technique 800 for determination of system dependencies using a relationship network graph. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, the technique 800 includes building a relationship network graph having nodes representing entities and edges representing interactions between respective entities. In some implementations, building a relationship network graph can include receiving records of interactions between entities, receiving contextual information providing context for the interactions between the entities, and building interaction information based on the records of interactions between the entities and the contextual information. In some implementations, the edges between the entities can be weighted based on the contextual information. Building a relationship network graph can be performed in the manner described in relation to FIGS. 7A-7F.

At 804, the technique 800 includes analyzing the relationship network graph to identify pairs of nodes having a relationship based on an evaluation between edge paths between the pairs of nodes compared to edge paths between other pairs of nodes. Analyzing the relationship between the nodes in the network graph may be done using known algorithms and techniques for analysis of a network graph. In some implementations, the relationships among the entities are identified based on a weighted path between the entities surpassing a threshold level.

At 806, the technique 800 includes creating associations between services owned by entities represented by the nodes of a pair of nodes identifying that the nodes are dependent on one another. Creating the associations between services may be performed by creating a data structure creating respective links between the services.

In some implementations, the technique 800 can include generating a service incident alert for a first service associated with a first entity represented by a first node of a pair of nodes. The message can include an identification of a second service associated with a second entity represented by a second node of the pair of nodes. The alert can then be sent to the first entity. In some implementations, the first message is a service incident alert, and the second message is a related service incident alert.

In some implementations, the technique 800 can include sending a first message for a first service associated with a first entity represented by a first node of a pair of nodes and sending a second message for a second service associated with a second entity represented by a second node of the pair of nodes based on the association between the nodes.

In some implementations, the technique 800 can include sending information describing at least one association between services to an entity represented by one of the nodes of the pairs of nodes.

The relationships among the entities can be used to generate a graph of service dependencies. For example, a first service owned by a first entity represented by a first node of a pair of related nodes can have a dependency created for a second service owned by a second entity represented by a second node of the pair of nodes. The second node may be part of a related pair that includes the second node and a third node. The second service owned by the second entity represented by the second node can have a dependency created for a third service owned by a third entity represented by the third node. This process can be continued to generate a complete graph of the dependencies between services. In some implementations, the graph of the dependencies can be generated, and a visual representation therefor is displayed. For example, via user interfaces of the system 500, a user may select a service and request that the services related to the service (and their related services, and so on) be graphically displayed. In an example, the user may issue a command to the system 500 to display a graph of all the known service dependencies.

For simplicity of explanation, the technique 800 of FIG. 8 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "software" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, and/or the like. A software may be compiled into executable programs or written in interpreted programming languages. Software may be callable from other software or from themselves. Software described herein refer to one or more logical modules that can be merged with other software or applications, or can be divided into sub-software or tools. The software can be stored in non-transitory computer-readable medium or computer storage devices and be stored on and executed by one or more general purpose computers, thus creating a special purpose computer configured to provide the software.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   collecting interaction data between entities responsible for services in an information technology environment, wherein the interaction data includes communications between the entities, wherein at least some of the entities represent respective persons, teams, or organizations of people;
   constructing a relationship network graph based on the interaction data, wherein nodes of the relationship network graph represent the entities and edges of the relationship network graph represent interactions between the entities; and
   identifying dependencies between the services based on the relationship network graph.

2. The method of claim 1, further comprising:
   updating the relationship network graph and the identified dependencies as new interaction data is collected.

3. The method of claim 1, further comprising:
   receiving an event related to one of the services; and
   assigning an incident associated with the event to one or more entities based on the relationship network graph.

4. The method of claim 1, further comprising:
   generating a secondary alert for a second service identified, based on the relationship network graph, as dependent on a first service when an issue with the first service is identified.

5. The method of claim 4, further comprising:
   identifying a service dependency strength between the first service and the second service;
   determining that a dependency strength between the first service and the second service meets a predefined threshold; and
   in response to determining that the dependency strength between the first service and the second service meets the predefined threshold, generating the secondary alert.

6. The method of claim 1, further comprising:
   augmenting the relationship network graph based on user input of known dependencies.

7. The method of claim 1, further comprising:
   assigning weights to the edges, wherein assigning the weights to the edges comprises:
   weighting an edge of the edges based on a frequency of interactions between a pair of the entities represented by nodes connected by the edge.

8. The method of claim 7, wherein a first edge corresponding to a first interaction directly related to a service incident is assigned a higher weight than a second interaction that does not relate to service incidents.

9. The method of claim 8, further comprising:
   identifying the first interaction as relating to the service incident based on a first time of the first interaction and a second time of the service incident.

10. The method of claim 1, further comprising:
    grouping alerts, into a group of alerts, based on the identified dependencies; and
    assigning the group of alerts to a service owner for resolution.

11. The method of claim 1, further comprising:
    providing a visual depiction of the relationship network graph to a user.

12. The method of claim 1, wherein collecting the interaction data comprises:

collecting, to form collected interaction data, data comprising email messages, chat messages, and telephone call logs; and adding metadata to the collected interaction data to provide additional context.

13. The method of claim 1, further comprising:

receiving a first alert associated with a first service;

receiving a second alert associated with a second service, wherein the second service is dependent on the first service;

determining a dependency strength between the first service and the second service based on the relationship network graph; and in response to determining that the dependency strength meets a dependency strength threshold, pausing the second alert for a predefined pause period.

14. A system, comprising:

one or more memories; and one or more processors, the one or more processors configured to execute instructions stored in the one or more memories to:

collect interaction data between entities responsible for services in an information technology environment, wherein the interaction data includes communications between the entities, wherein at least some of the entities represent respective persons, teams, or organizations of people;

construct a relationship network graph based on the interaction data, wherein nodes of the relationship network graph represent the entities and edges of the relationship network graph represent interactions between the entities; and identify dependencies between the services based on the relationship network graph.

15. The system of claim 14, wherein the one or more processors further configured to execute instructions stored in the one or more memories to:

generate a secondary alert for a second service identified, based on the relationship network graph, as dependent on a first service when an issue with the first service is identified.

16. The system of claim 14, wherein the one or more processors further configured to execute instructions stored in the one or more memories to:

identify a service dependency strength between a first service and a second service;

determine that a dependency strength between the first service and the second service meets a predefined threshold; and in response to determining that the dependency strength between the first service and the second service meets the predefined threshold, generate a secondary alert for the second service in addition to an alert generated for the first service.

17. The system of claim 14, wherein the one or more processors further configured to execute instructions stored in the one or more memories to:

augment the relationship network graph based on user input of known dependencies.

18. One or more non-transitory computer readable media storing instructions operable to cause one or more processors to perform operations comprising:

collecting interaction data between entities responsible for services in an information technology environment, wherein the interaction data includes communications between the entities, wherein at least some of the entities represent respective persons, teams, or organizations of people;

constructing a relationship network graph based on the interaction data, wherein nodes of the relationship network graph represent the entities and edges of the relationship network graph represent interactions between the entities; and identifying dependencies between the services based on the relationship network graph.

19. The one or more non-transitory computer readable media of claim 18, wherein the operations further comprise:

grouping alerts, into a group of alerts, based on the identified dependencies; and assigning the group of alerts to a service owner for resolution.

20. The one or more non-transitory computer readable media of claim 18, wherein the operations further comprise:

assigning weights to the edges, wherein assigning the weights to the edges comprises:

weighting an edge of the edges based on a frequency of interactions between a pair of the entities represented by nodes connected by the edge.

* * * * *